United States Patent
Hirai et al.

(10) Patent No.: US 7,194,240 B2
(45) Date of Patent: Mar. 20, 2007

(54) RADIO COMMUNICATION APPARATUS

(75) Inventors: Hiroaki Hirai, Tokyo (JP); Akinori Fujimura, Tokyo (JP); Yukimasa Nagai, Tokyo (JP); Yosikatu Tajima, Tokyo (JP); Mari Otiai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 104 days.

(21) Appl. No.: 10/525,069

(22) PCT Filed: Jun. 15, 2004

(86) PCT No.: PCT/JP2004/008687

§ 371 (c)(1),
(2), (4) Date: Feb. 18, 2005

(87) PCT Pub. No.: WO2004/114620

PCT Pub. Date: Dec. 29, 2004

(65) Prior Publication Data

US 2006/0046731 A1   Mar. 2, 2006

(30) Foreign Application Priority Data

Jun. 18, 2003   (JP) .............................. 2003-173725

(51) Int. Cl.
*H04B 1/00* (2006.01)
*H04B 7/005* (2006.01)
*H04Q 7/20* (2006.01)

(52) U.S. Cl. ...................... 455/69; 370/278; 455/452.2

(58) Field of Classification Search ............. 455/452.2, 455/24, 452.1, 500, 509, 550.1, 502, 126, 455/512, 562.1, 575.7, 101, 450; 370/337, 370/347–349, 278, 328–330, 335, 336, 342–343, 370/441, 442, 252

See application file for complete search history.

(56) References Cited

U.S. PATENT DOCUMENTS

| 2002/0049058 | A1* | 4/2002 | Tee .............................. 455/437 |
| 2003/0185181 | A1* | 10/2003 | Balachandran et al. ..... 370/337 |
| 2004/0077378 | A1* | 4/2004 | Kim et al. ................ 455/562.1 |
| 2005/0037718 | A1* | 2/2005 | Kim et al. .................. 455/101 |
| 2005/0043031 | A1* | 2/2005 | Cho et al. .................... 455/450 |

FOREIGN PATENT DOCUMENTS

| JP | 10-079724 A | 3/1998 |
| JP | 2002-051099 A | 2/2002 |
| JP | 2002-135304 A | 5/2002 |

* cited by examiner

*Primary Examiner*—Naghmeh Mehrpour
(74) *Attorney, Agent, or Firm*—Birch, Stewart, Kolasch & Birch, LLP

(57) ABSTRACT

A reception processing unit measures reception states of input reception signals of each of a plurality of channels, generates local channel reception information, and applies a reception processing to the input reception signals to generate decoded signals. A media-access-control unit generates transmission frames for each of the channels using transmission data. A transmission processing unit generates radio signals including each of the transmission frames. A channel-information processing unit generates local feedback information, and inserts the local feedback information generated into at least one of the radio signals that are transmitted by the radio communication apparatus.

21 Claims, 10 Drawing Sheets

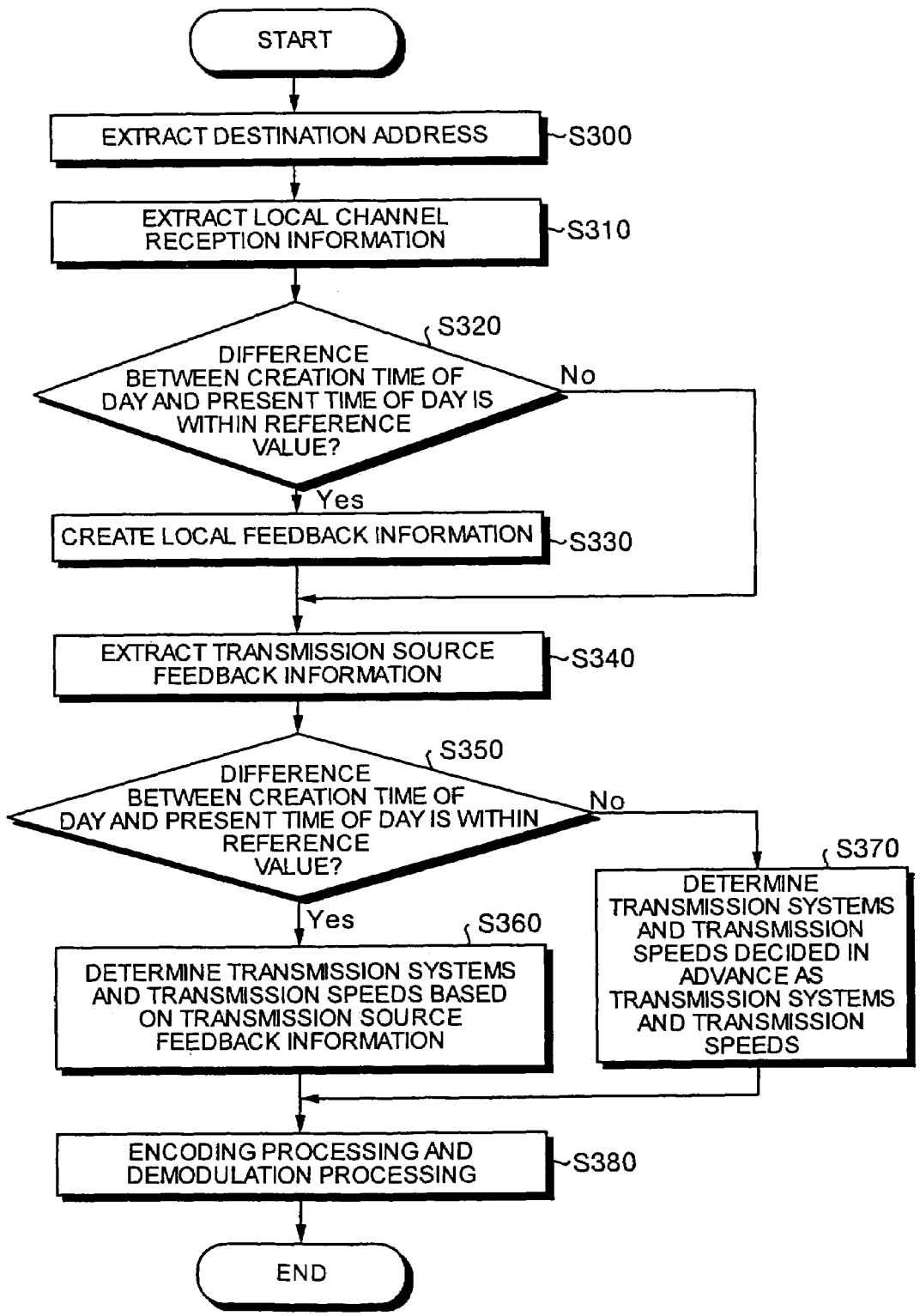

RADIO COMMUNICATION APPARATUS

TECHNICAL FIELD

The present invention relates to a radio communication apparatus that uses plural channels simultaneously to perform mutual communication, and in particular to a radio communication apparatus that notifies other radio communication apparatus of a reception state of a channel to be used and selects an appropriate communication system and communication speed.

BACKGROUND ART

In recent years, an increase in communication speed is demanded in a radio communication apparatus as well. Therefore, in a radio communication system, the increase in communication speed is realized by increasing a transmission capacity using plural channels.

In a conventional technology for realizing the increase in communication speed using plural channels, plural channels are allocated and secured in advance in a path between a specific communication unit system and a specific terminal unit system, in which a wide transmission band is required, to perform communication on the plural channels (see, for example, Japanese Application Laid-Open Publication No. 2002-135304).

However, in the case of radio communication, communication state changes depending on environments like obstacles and weather conditions (e.g., rainy weather). In addition, in the case of mobile communication, a communication state always changes with time due to movements. In the conventional technology, a technique for selecting transmission systems and transmission speeds suitable for communication states in performing communication on plural channels is not disclosed. Therefore, there is a problem in that it is impossible to select a transmission system and a transmission speed suitable for a communication state in each channel.

For example, in the conventional technology, when a modulation system with a high transmission speed is adopted, although a transmission speed is increased, communication cannot be performed in a place where a state of a transmission channel is bad and retransmission requests increase, which results in decline in throughput. In addition, when a modulation system in which communication is possible even when a state of a transmission channel is bad, a communication speed falls, and an advantage of increasing a transmission capacity using plural channels is reduced.

The present invention has been devised in view of the above, and it is an object of the present invention to provide a radio communication apparatus that can select transmission systems and transmission speeds corresponding to respective channels in performing mutual communication using plural channels.

DISCLOSURE OF THE INVENTION

To achieve the above object, a radio communication apparatus according to one aspect of the present invention, which is applied to a radio communication system and communicates with other radio communication apparatus in the radio communication system using one available channel or a plurality of channels, includes a reception processing unit that, when input reception signals of the channels of the radio communication system is received, measures reception states of input reception signals of each of the channels, generates local channel reception information of each of the channels based on a result of the measurement, and applies a reception processing to the input reception signals to generate decoded signals; a media-access-control unit that, when data is transmitted using two or more channels, generates transmission frames for each of the channels using transmission data; a transmission processing unit that generates radio signals including each of the transmission frames; and a channel-information processing unit that generates local feedback information based on the local channel reception information, and inserts the local feedback information generated into one of the radio signals or a plurality of the radio signals. The radio communication apparatus transmits the radio signals including the local feedback information.

According to the present invention, a reception processing unit generates local channel reception information based on reception states of input reception signals of respective channels, a channel-information processing unit generates local feedback information based on the local channel reception information generated by the reception processing unit, inserts the generated local feedback information into radio signals, and transmits the radio signals.

BRIEF DESCRIPTION OF THE DRAWINGS

FIG. 10 is a flowchart for explaining a transmission operation of the radio communication apparatus according to the sixth embodiment.

BEST MODE FOR CARRYING OUT THE INVENTION

Exemplary embodiments of a radio communication apparatus according to the present invention will be explained in detail with reference to the accompanying drawings.

Figure 1:
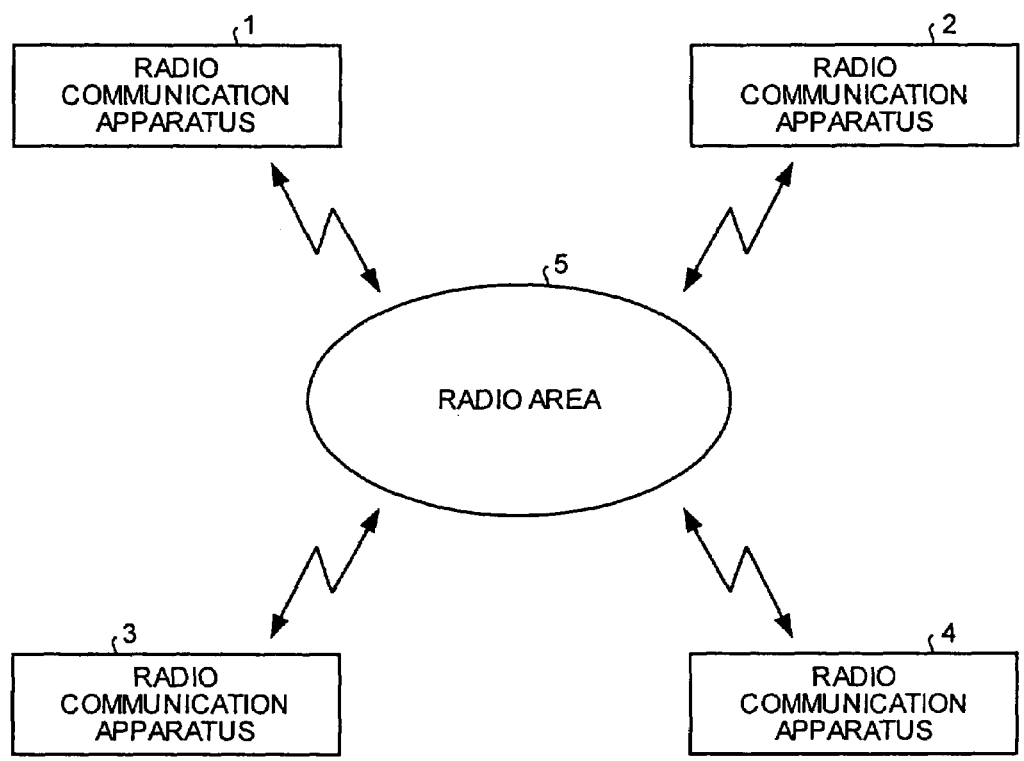
FIG. 1 is a schematic diagram of a structure of a radio communication system to which a radio communication apparatus according to the present invention is applied.

FIG. 1 is a schematic diagram of a structure of a radio communication system to which a radio communication apparatus according to the present invention is applied. The radio communication system, to which the radio communication apparatus in the present invention is applied, includes plural (four in this case; however, the number is irrelevant the number of channels and the number of radio communication apparatuses in a radio communication area) radio communication apparatuses 1 to 4 that performs mutual communication via a radio area 5 that uses plural (three in this case) channels. It is assumed that all the radio communication apparatuses 1 to 4 have the same functions.

Note that the channels of this radio communication apparatus indicate communication paths that are set for performing communication at, for example, a frequency, time, a code, and a space (multi input multi output (MIMO)).

Figure 2:
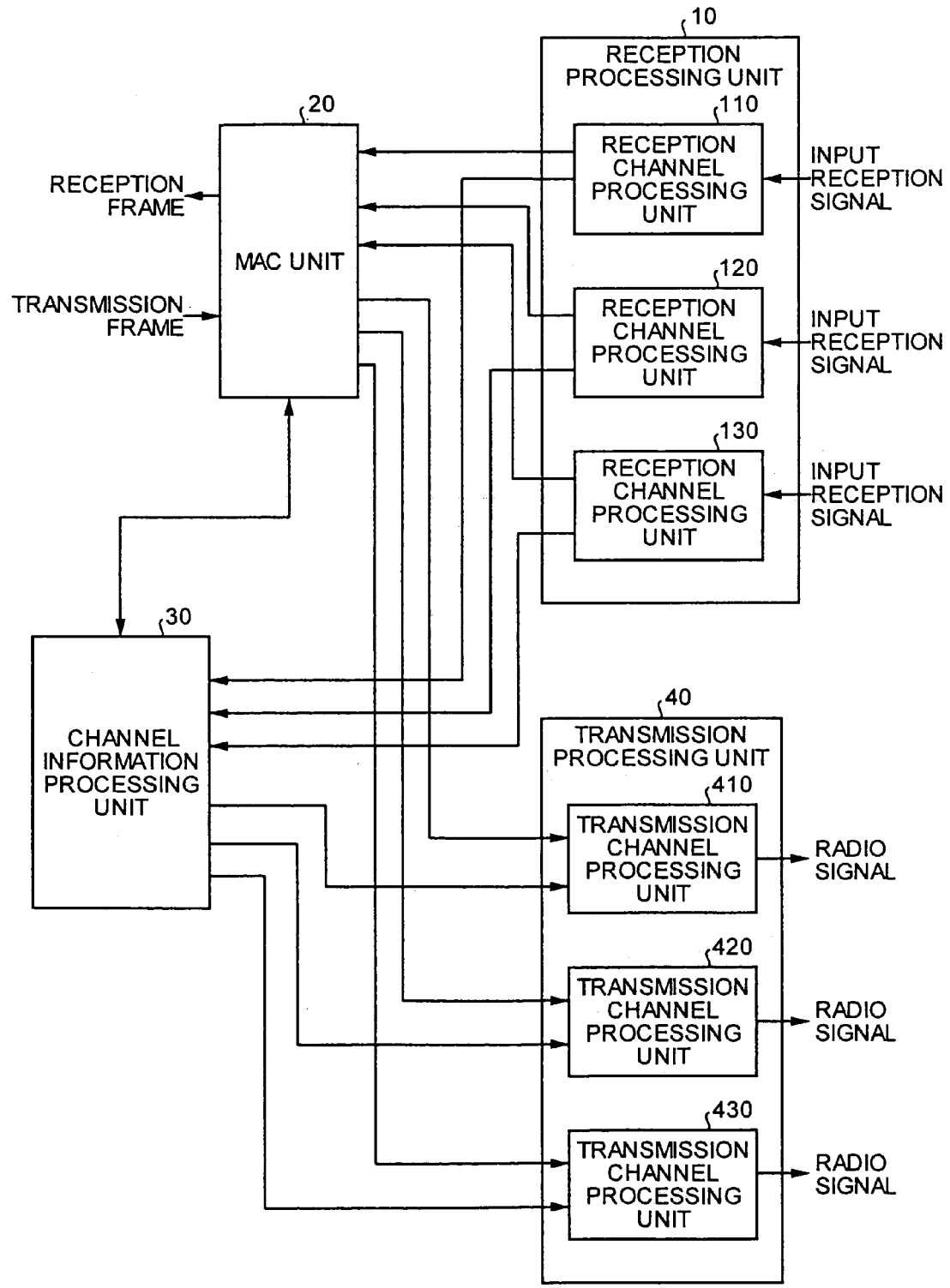
FIG. 2 is a block diagram of a structure of transmission and reception functions of a radio communication apparatus according to a first embodiment of the present invention.

A first embodiment of the present invention will be explained using FIG. 2. FIG. 2 is a block diagram of a structure of transmission and reception functions of a radio communication apparatus 1 according to the first embodiment. The radio communication apparatus 1 according to the first embodiment of the present invention includes a reception processing unit 10 that has plural (three in this case) reception channel processing units 110 to 130 corresponding to the number of channels usable by the apparatus itself, a media access control (MAC) unit 20, a channel-information processing unit 30, and a transmission processing unit 40 that has plural (three in this case) transmission channel processing units 410 to 430 corresponding to the number of channels usable by the apparatus itself.

The reception channel processing unit 110 receives an input reception signal of a channel corresponding to the reception channel processing unit 110 and applies synchronization processing, demodulation processing, and decoding processing to the input reception signal. In addition, the reception channel processing unit 110 measures reception levels of input reception signals in the respective channels. Then, the reception channel processing unit 110 generates local channel reception information based on the measured reception levels or receive signal strength indication (RSSI) and reception channel processing internal information that is physical resources like a memory, a buffer, and a central processing unit (CPU) and state resources of a control signal and the inside of the memory according to processing of the channel itself. The reception channel processing unit 110 judges whether feedback information is included in the input reception signal. The feedback information is information related to overall resources like reception state information of the channel and states of the memory, the CPU, and the buffer.

The reception channel processing units 120 and 130 have the same function as the reception channel processing unit 110 and apply the same processing as the reception channel processing unit 110 to channels corresponding to the reception channel processing units 120 and 130, respectively.

At the time of a reception operation, the MAC unit 20 controls the reception channel processing units 110 to 130 serving as physical communication media and applies processing like protocol conversion and frame conversion to respective decoded signals to generate reception frames. In addition, the MAC unit 20 judges whether feedback information is included in the respective decoded signals.

At the time of a transmission operation, the MAC unit 20 applies the processing such as the protocol conversion and the frame conversion to a transmission frame inputted from an upper layer to generate transmission frames of respective channels. In addition, the MAC unit 20 exchanges resource information with the channel-information processing unit 30 and determines transmission systems and transmission speeds for the respective channels based on feedback information of the respective channels from a transmission source that is inputted from the channel-information processing unit 30.

The channel-information processing unit 30 mutually exchanges resource information, which is the physical resources such as the memory, the buffer, and the CPU and the state resources of a control signal and the inside of the memory, with the MAC unit 20 to perform a reception operation and generates local feedback information based on respective pieces of local channel reception information inputted from the reception channel processing units 110 to 130 and the resource information. The local feedback information may be all determined pieces of the local channel reception information and the resource information or may be information that is selected out of the local channel reception information and the resource information and aggregated every time.

In addition, the channel-information processing unit 30 judges whether the respective pieces of transmission source feedback information inputted from the reception channel processing units 110 to 130 or the MAC unit 20 have identical contents. As the judgment, for example, when cyclic redundancy check (CRC) is used, the channel-information processing unit 30 discards the pieces of transmission source feedback information for which the CRC indicates an error and adopts only the pieces of transmission source feedback information for which the CRC is normal, or adopts the pieces of transmission source feedback information that have identical contents and are largest in number, or measures a carrier/noise ratio (C/N) and a desired/undesired ratio (DIU) for each channel and adopts the transmission source feedback information of a channel having highest C/N and D/U, or synthesizes weighting according to probability with respect to all pieces of the information and adopts the respective pieces of transmission source feedback information based on the weighting.

The channel-information processing unit 30 discards the transmission source feedback information of a wrong channel as a result of the judgment and extracts feedback information of respective channels from the accurate transmission source feedback information.

The transmission channel processing unit 410 selects a transmission system and a transmission speed of a channel based on transmission control information. Then, based on the selected transmission system and transmission speed, the transmission channel processing unit 410 applies encoding processing and modulation processing to the transmission frame inputted from the MAC unit 20 and the local feedback information inputted from the channel-information processing unit 30 to generate a radio signal.

The transmission channel processing units 420 and 430 have the same function as the transmission channel processing unit 410 and apply the same processing as the transmission channel processing unit 410 to channels corresponding to the transmission channel processing units 420 and 430, respectively.

Next, operations of the radio communication apparatus will be explained. First, a reception operation will be explained. The reception channel processing units 110 to 130 receive input reception signals in the corresponding channels, respectively, apply demodulation processing and decoding processing to the input reception signals, and output decoded signals to the MAC unit 20. At the same time, the reception channel processing units 110 to 130 measure reception levels of the input reception signals in the respective channels, and generate local channel reception information based on the measured respective reception levels and reception channel processing internal information. Then, the reception channel processing units 110 to 130 output the generated local channel reception information to the channel-information processing unit 30. In addition, the reception channel processing units 110 to 130 judge whether feedback information is included in the input reception signals and, when feedback information is included in the input reception signals, output the feedback information in the input reception signals to the channel-information processing unit 30 as transmission source feedback information.

The MAC unit 20 applies the processing such as the protocol conversion and the frame conversion to the decoded signals inputted from the reception channel processing units 110 to 130, respectively, generates reception frames, and outputs the reception frames to the upper layer. In addition, the MAC unit 20 judges whether feedback information is included in the respective decoded signals and, when feedback information is included in the decoded signals, outputs the feedback information in the decoded signals to the channel-information processing unit 30 as transmission source feedback information.

Next, a transmission operation will be explained. The channel-information processing unit 30 generates local feedback information based on the respective pieces of local channel reception information inputted from the reception channel processing units 110 to 130 and the resource information, copies the generated local feedback information, and outputs the local feedback information to the transmission channel processing units 410 to 430. At the same time, the channel-information processing unit 30 extracts accurate transmission source feedback information from the respective pieces of transmission source feedback information inputted from the reception channel processing units 110 to 130 or the MAC unit 20 and outputs the extracted feedback information of the respective channels to the MAC unit 20.

The MAC unit 20 applies the processing such as the protocol conversion and the frame conversion to a transmission frame inputted from the upper layer to generate transmission frames of the respective channels. Then, the MAC unit 20 outputs the generated respective transmission frames to the transmission channel processing units 410 to 430. In addition, the MAC unit 20 exchanges the resource information with the channel-information processing unit 30 and determines transmission systems and transmission speeds of the respective channels based on the feedback information of the respective channels from a transmission source that is inputted from the channel-information processing unit 30. Then, the MAC unit 20 outputs the transmission systems and the transmission speeds determined for the respective channels to the transmission channel processing units 410 to 430 as transmission control information.

The transmission channel processing units 410 to 430 select transmission systems and transmission speeds of the channels based on the respective pieces of transmission control information inputted from the MAC unit 20. Then, based on the selected transmission systems and transmission speeds, the transmission channel processing units 410 to 430 apply the encoding processing and the modulation processing to the transmission frames inputted from the MAC unit 20 and the local feedback information inputted from the channel-information processing unit 30 to generate radio signals. Then, the transmission channel processing units 410 to 430 output the generated radio signals.

In this way, according to the first embodiment, the reception channel processing units 110 to 130 generate local channel reception information based on reception states of respective input reception signals, and the channel-information processing unit 30 generates local feedback information based on the local channel reception information generated by the reception channel processing units 110 to 130 and the resource information and inserts the generated local feedback information into a radio signal to be transmitted on a channel used for transmission. Thus, it is possible to notify other radio communication apparatus of states of respective channels such that the other radio communication apparatus can select transmission systems and transmission speeds suitable for the states of the respective channels.

In addition, the MAC unit 20 determines transmission systems and transmission speeds of the respective channels based on respective pieces of local feedback information inserted by the other radio communication apparatus (transmission source feedback information of the apparatus itself). This makes it possible to select transmission systems and transmission speeds of the respective channels, and retransmission requests can be controlled to improve throughput and reduce communication delays.

Moreover, since local feedback information is inserted into all channels to be used, it is possible to learn feedback information of the respective channels if one channel among plural channels can be received.

A second embodiment of the present invention will be explained using FIG. 3. According to the first embodiment, local feedback information is inserted into all channels. According to the second embodiment, channels into which local feedback information is inserted are limited, whereby a radio band necessary for notifying the local feedback information of other radio communication apparatus is reduced to realize an increase in a radio capacity.

Figure 3:
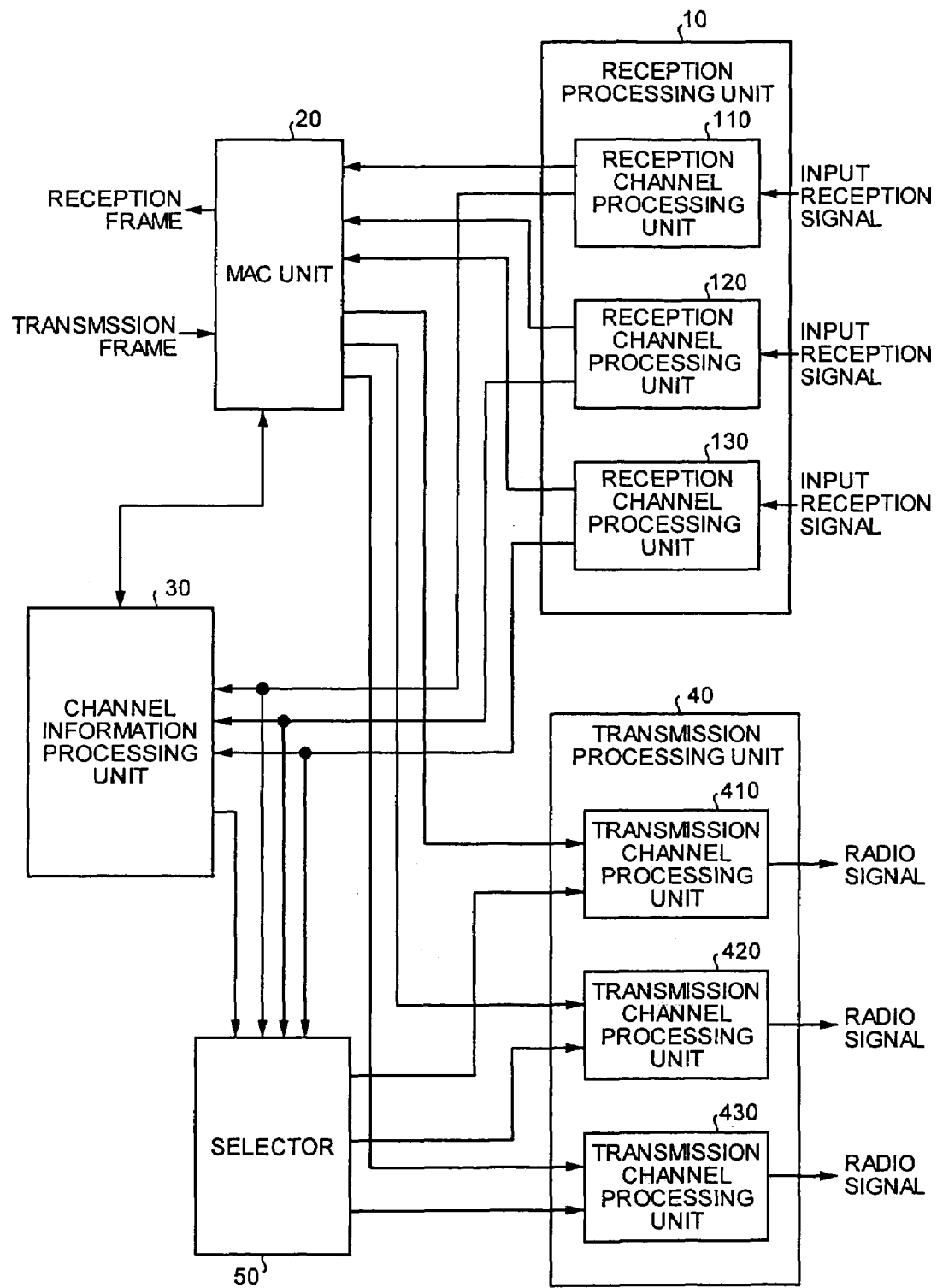
FIG. 3 is a block diagram of a structure of transmission and reception functions of a radio communication apparatus according to a second embodiment of the present invention.

FIG. 3 is a block diagram of a structure of transmission and reception functions of a radio communication apparatus according to the second embodiment. In the radio communication apparatus 1 according to the second embodiment, a selector 50 is added to the radio communication apparatus 1 according to the first embodiment shown in FIG. 2. Components having the same functions as those according to the first embodiment will be denoted by the identical reference numerals, and a redundant explanation will be omitted.

The selector 50 determines a channel, on which local feedback information generated by the channel-information processing unit 30 is transmitted, based on respective pieces of local channel reception information inputted from the reception channel processing units 110 to 130. The local channel reception information is information such as the C/U and the D/U. The selector 50 judges communication states of respective channels from these pieces of local channel reception information and selects a channel having a best communication state. In other words, from the local channel reception information of the respective channels, the selector 50 judges which channel should be used to transmit local feedback information such that the local feedback information can be notified to other radio communication apparatus at a high probability. Note that a selection method is not limited to this and, for example, a specific number of specific channels may be used without using channel information.

Next, operations of the radio communication apparatus according to the second embodiment of the present invention will be explained. First, a reception operation will be explained. The reception channel processing units 110 to 130 receive input reception signals in the corresponding channels, respectively, apply the demodulation processing and the decoding processing to the input reception signals, and output decoded signals to the MAC unit 20. At the same time, the reception channel processing units 110 to 130 generate local channel reception information based on reception levels of respective channels and reception channel processing internal information. Then, the reception channel processing units 110 to 130 output the generated local channel reception information to the channel-information processing unit 30 and the selector 50. In addition, when feedback information is included in the input reception signals, the reception channel processing units 110 to 130 output the feedback information in the input reception signals to the channel-information processing unit 30 as transmission source feedback information.

The MAC unit 20 applies the processing such as the protocol conversion and the frame conversion to the decoded signals inputted from the reception channel processing units 110 to 130, respectively, generates reception frames, and outputs the reception frames to the upper layer. In addition, the MAC unit 20 judges whether feedback information is included in the respective decoded signals and, when feedback information is included in the decoded signals, outputs the feedback information in the decoded signals to the channel-information processing unit 30 as transmission source feedback information.

Next, a transmission operation will be explained. The channel-information processing unit 30 generates local feedback information based on the respective pieces of local channel reception information inputted from the reception channel processing units 110 to 130 and resource information and outputs the generated local feedback information to the selector 50. In addition, the channel-information processing unit 30 outputs feedback information of the respective channels for the transmission source feedback information, which is inputted from the reception channel processing units 110 to 130 or the MAC unit 20, to the MAC unit 20.

The MAC unit 20 applies the processing such as the protocol conversion and the frame conversion to a transmission frame inputted from the upper layer to generate transmission frames of the respective channels. Then, the MAC unit 20 outputs the generated respective transmission frames to the transmission channel processing units 410 to 430. In addition, the MAC unit 20 exchanges the resource information with the channel-information processing unit 30 and determines transmission systems and transmission speeds of the respective channels based on the feedback information of the respective channels from a transmission source that is inputted from the channel-information processing unit 30. Then, the MAC unit 20 outputs the transmission systems and the transmission speeds determined for the respective channels to the transmission channel processing units 410 to 430 as transmission control information.

The selector 50 determines a channel, on which the local feedback information generated by the channel-information processing unit 30 is transmitted, based on the respective pieces of local channel reception information inputted from the reception channel processing units 110 to 130. Then, the selector 50 outputs the local feedback information to a transmission channel processing unit corresponding to the determined channel.

The transmission channel processing units 410 to 430 select transmission systems and transmission speeds of the channels based on the respective pieces of transmission control information inputted from the MAC unit 20. Then, based on the selected transmission systems and transmission speeds, the transmission channel processing units 410 to 430 apply the encoding processing and the modulation processing to the transmission frames inputted from the MAC unit 20 to generate radio signals. In that case, when the local feedback information is inputted from the selector 50, the transmission channel processing units 410 to 430 apply the encoding processing and the modulation processing to the transmission frames and the local feedback information to generate radio signals. Then, the transmission channel processing units 410 to 430 output the generated radio signals.

In this way, according to the second embodiment, the selector 50 determines a channel, on which local feedback information generated by the channel-information processing unit 30 is transmitted, based on the respective pieces of local channel reception information inputted from the reception channel processing units 110 to 130 to limit channels into which the local feedback information is inserted. Thus, it is possible to reduce radio bands in which the local feedback information is notified to other radio communication apparatus and realize an increase in a radio capacity.

Note that, although the selector 50 is independently provided according to the second embodiment, the function of the selector 50 may be included in the channel-information processing unit 30.

Figure 4:
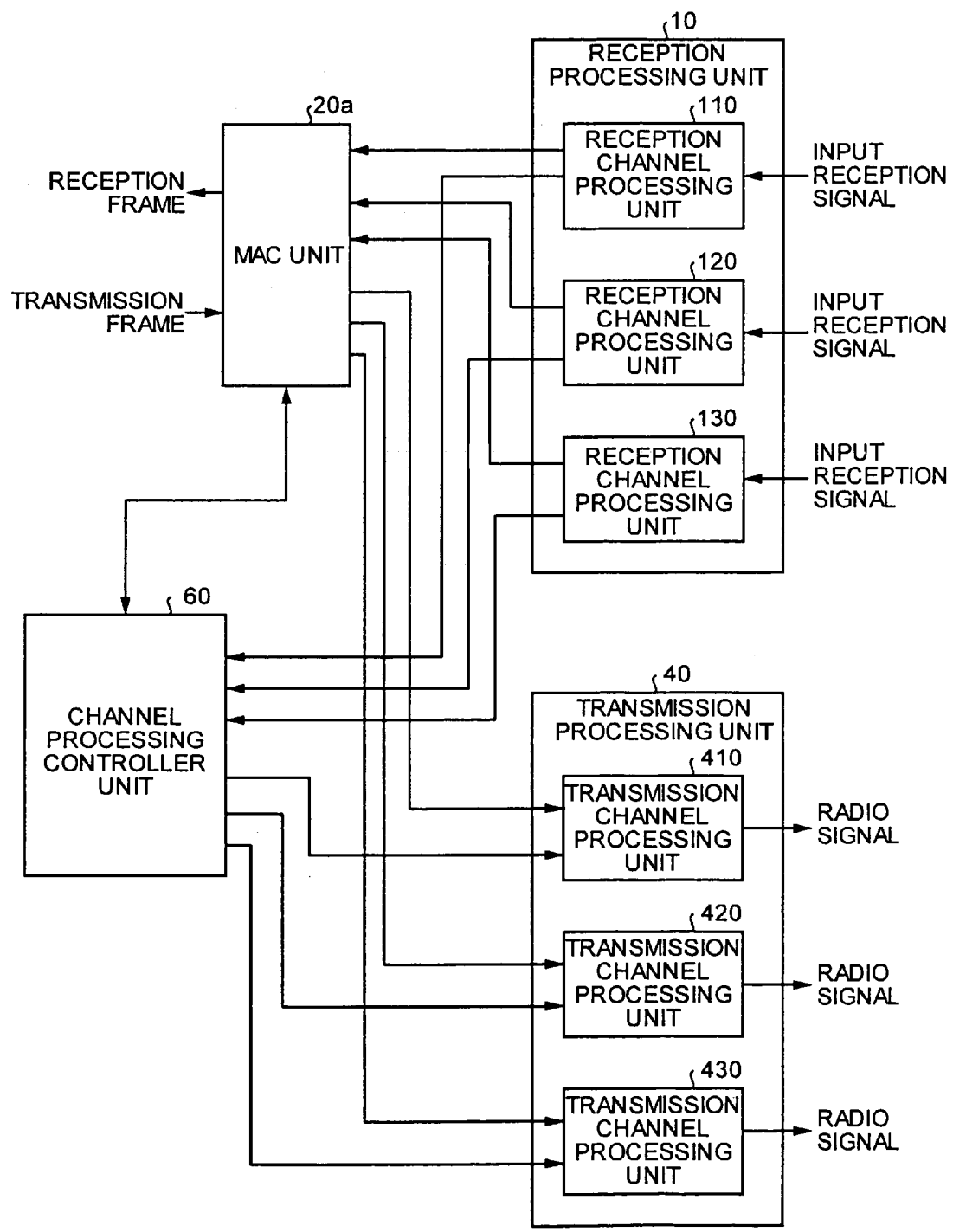
FIG. 4 is a block diagram of a structure of transmission and reception functions of a radio communication apparatus according to a third embodiment of the present invention.

A third embodiment of the present invention will be explained using FIG. 4. FIG. 4 is a block diagram of a structure of transmission and reception functions of a radio communication apparatus according to the third embodiment. In the radio communication apparatus 1 according to the third embodiment, a MAC unit 20a is provided instead of the MAC unit 20 of the radio communication apparatus 1 according to the first embodiment shown in FIG. 1, and a channel processing control unit 60 (channel-information processing unit described in patent claims) is provided instead of the channel-information processing unit 30.

The MAC unit 20a applies the processing such as the protocol conversion and the frame conversion to decoded signals inputted from the reception channel processing units 110 to 130, respectively, generates reception frames, and outputs the reception frames to an upper layer. At the same time, the MAC unit 20a outputs address information (transmission source addresses) in the respective reception frames to the channel processing control unit 60. In addition, the MAC unit 20a applies the processing such as the protocol conversion and the frame conversion to a transmission frame inputted from the upper layer to generate transmission frames of the respective channels.

The channel processing control unit 60 belongs to a physical layer and performs timing control and feedback processing control for the reception processing unit 10 and the transmission processing unit 40 belonging to the same physical layer. The channel processing control unit 60 identifies a transmission source address of other radio communication apparatus from the respective pieces of address information or input reception signals of the respective channels and creates a local feedback table in which transmission source addresses and respective pieces of channel reception information are associated with each other. More specifically, the channel processing control unit 60 generates a local feedback table in which transmission source addresses and the respective pieces of local cannel reception information of the reception channel processing units 110 to 130 are associated with each other. In addition, the channel processing control unit 60 determines transmission systems and transmission speeds of the respective channels based on the respective pieces of transmission source feedback information inputted from the reception channel processing units 110 to 130. Then, the channel processing control unit 60 registers the determined transmission systems and transmission speeds in the local feedback table for the respective channels in association with the transmission source addresses. Note that it is also possible that transmission source feedback information is registered in association with transmission source addresses in the local feedback table, and a transmission system and a transmission speed are determined at the time of transmission based on this transmission source feedback information.

Next, operations of the radio communication apparatus according to the third embodiment of the present invention will be explained. First, a reception operation will be explained. The reception channel processing units 110 to 130 receive input reception signals in the corresponding channels, respectively, apply the synchronization processing, the demodulation processing, and the decoding processing to the input reception signals, and output decoded signals to the MAC unit 20a. At the same time, the reception channel processing units 110 to 130 generate local channel reception information based on reception levels of the respective channels and reception channel processing internal information. Then, the reception channel processing units 110 to 130 output the generated local channel reception information to the channel processing control unit 60. In addition, the reception channel processing units 110 to 130 judge whether feedback information is included in the input reception signals and, when feedback information is included in the input reception signals, output the feedback information in the input reception signals to the channel-information processing unit 30 as transmission source feedback information.

The MAC unit 20a applies the processing such as the protocol conversion and the frame conversion to the decoded signals inputted from the reception channel processing units 110 to 130, respectively, generates reception frames, and outputs the reception frames to the upper layer. In addition, the MAC unit 20a outputs transmission source addresses in the respective reception frames to the channel processing control unit 60.

The channel processing control unit 60 identifies a transmission source address of other radio communication apparatus from the respective transmission source addresses inputted from the MAC unit 20a or the input reception signals of the respective channels and creates a local feedback table in which the transmission source addresses and respective pieces of local channel reception information are associated with each other.

Next, a transmission operation will be explained. The MAC unit 20a applies the processing such as the protocol conversion and the frame conversion to a transmission frame inputted from the upper layer to generate transmission frames of the respective channels. Then, the MAC unit 20a outputs the generated respective transmission frames to the transmission channel processing units 410 to 430. In addition, the MAC unit 20a outputs destination addresses in the respective transmission frames to the channel processing control unit 60.

The channel processing control unit 60 searches through the local feedback table with the destination addresses as keywords and determines local feedback information, transmission systems, and transmission speeds of the respective channels. When data is transmitted to the transmission source addresses at the time when the local feedback information table is generated, it is sufficient to search through the local feedback table with the destination addresses of the transmission frames generated by the MAC unit 20a as keywords. The channel processing control unit 60 outputs the local feedback information, the transmission systems, and the transmission speeds, which are determined for the respective channels, to the corresponding channel transmission channel processing unit 410 to 440, respectively.

The transmission channel processing units 410 to 430 select transmission systems and transmission speeds of the channels based on the respective transmission systems and transmission speeds inputted from the channel processing control unit 60. Then, based on the selected transmission systems and transmission speeds, the transmission channel processing units 410 to 430 apply the encoding processing and the modulation processing to the transmission frame inputted from the MAC unit 20a and the local feedback information inputted from the channel processing control unit 60 to generate radio signals. Then, the transmission channel processing units 410 to 430 output the generated radio signals.

In this way, according to the third embodiment, the MAC unit 20a notifies the channel processing control unit 60 of the transmission source addresses and the destination addresses, the channel processing control unit 60 generates a local feedback table associating the transmission source addresses and local feedback information, and at the time of transmission, the channel processing control unit 60 generates local feedback information based on the local feedback table and determines transmission systems and transmission speeds of the respective channels. Thus, it is possible to perform processing with the processing closed in a physical layer and to cope with system change of a MAC layer or higher layers easily.

In addition, since it is possible to perform processing with the processing closed in a physical layer, for example, in the case of a system returning response frames in response to transmission frames, it is possible to insert local feedback information into part of the response frames. The local feedback information is notified to other radio communication apparatus in shortest time, which makes it possible to perform high-speed feedback processing even when a fluctuation state in a transmission channel is intense and deterioration of radio signals in the respective channels is severe.

Figure 5:
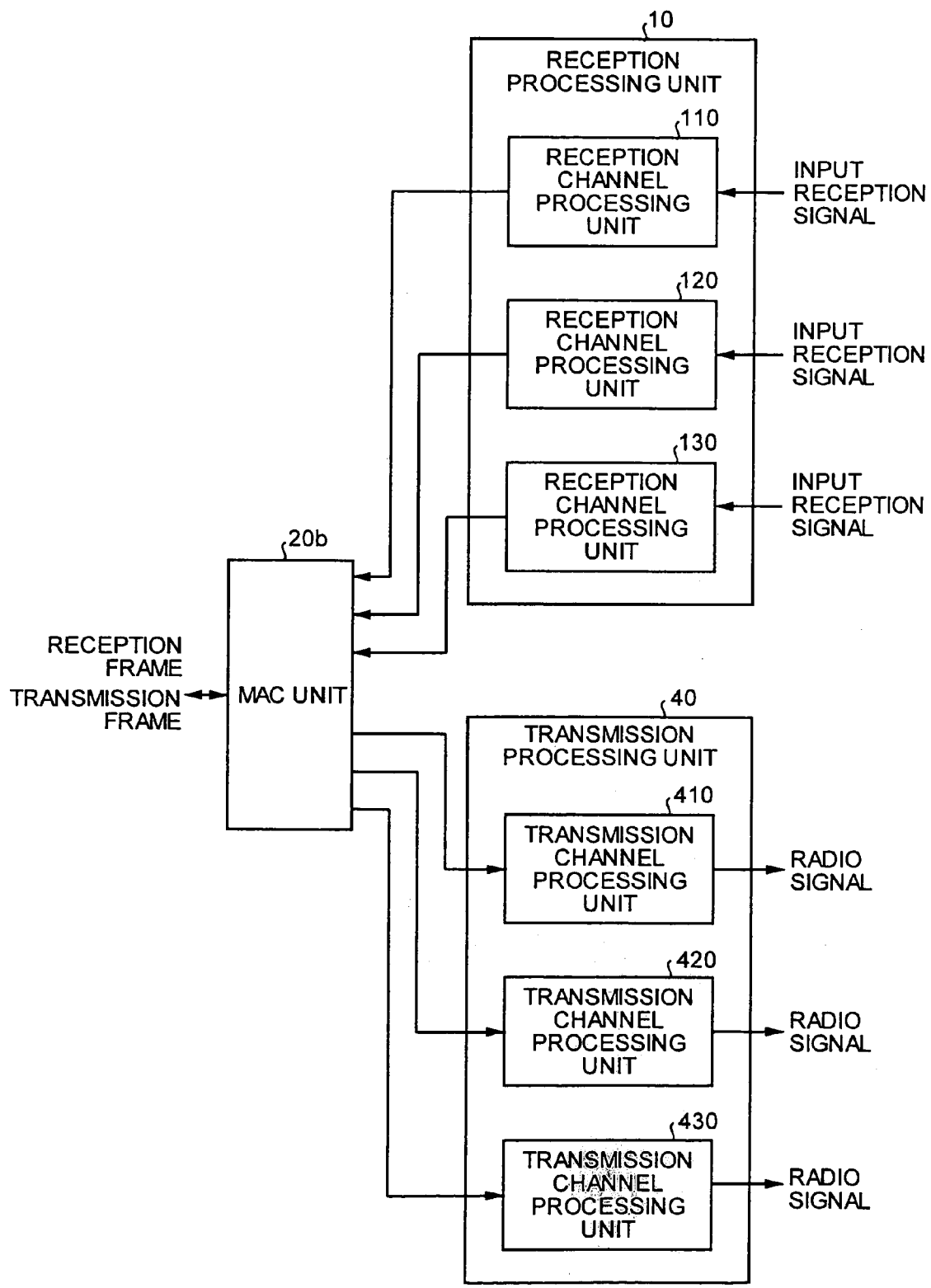
FIG. 5 is a block diagram of a structure of transmission and reception functions of a radio communication apparatus according to a fourth embodiment of the present invention.

A fourth embodiment of the present invention will be explained using FIG. 5. FIG. 5 is a block diagram of a structure of transmission and reception functions of the radio communication apparatus 1 according to the fourth embodiment. In the radio communication apparatus 1 according to the fourth embodiment, the channel-information processing unit 30 of the radio communication apparatus 1 according to the first embodiment shown in FIG. 2 is removed, and a MAC unit 20b is provided instead of the MAC unit 20. Components having the same functions as those according to the first embodiment will be denoted by the identical reference numerals, and a redundant explanation will be omitted.

At the time of a reception operation, the MAC unit 20b extracts feedback information included in decoded signals inputted from the reception channel processing units 110 to 130, respectively. Then, the MAC unit 20b creates a local feedback information table in which local channel reception information of the respective channels and the extracted feedback information are associated with the transmission source addresses. In addition, the MAC unit 20b applies the processing such as the protocol conversion and the frame conversion to the decoded signals inputted from the reception channel processing units 110 to 130, respectively, generates reception frames, and output the reception frames to the upper layer.

At the time of a transmission operation, the MAC unit 20b applies the processing such as the protocol conversion and the frame conversion to a transmission frame inputted from the upper layer to generate transmission frames of the respective channels. In that case, the MAC unit 20b inserts local feedback information into the respective transmission frames based on the local feedback information table and determines transmission systems and transmission speeds of the respective channels.

Next, operations of the radio communication apparatus according to the fourth embodiment of the present invention will be explained. First, a reception operation will be explained. The reception channel processing units 110 to 130 receive input reception signals in the corresponding channels, respectively, and apply the synchronization processing, the demodulation processing, and the decoding processing to the input reception signals to generate decoded signals. At the same time, the reception channel processing units 110 to 130 measure reception levels of the input reception signals in the respective channels, and generate local channel reception information based on the measured respective reception levels and reception channel processing internal information. The reception channel processing units 110 to 130 output the respective decoded signals and the local channel reception information to the MAC unit 20b.

The MAC unit 20b extracts feedback information from the decoded signals inputted from the reception channel processing units 110 to 130, respectively. Then, the MAC unit 20b generates a local feedback information table in which the local channel reception information for the respective channels and the extracted feedback information are associated with transmission source addresses. In addition, the MAC unit 20b applies the processing such as the protocol conversion and the frame conversion to the decoded signals, from which the feedback information is extracted, generates reception frames, and outputs the reception frames to the upper layer.

Next, a transmission operation will be explained. The MAC unit 20b applies the processing such as the protocol conversion and the frame conversion to a transmission frame inputted from the upper layer to generate transmission frames of the respective channels. In generating the transmission frames of the respective channels, the MAC unit 20b searches through the local feedback information table with destination addresses as keywords and extracts local channel reception information of the respective channels. Then, the MAC unit 20b generates local feedback information based on the local channel reception information corresponding to the respective channels and inserts the generated local feedback information into predetermined places of the transmission frames of the respective channels. In addition, the MAC unit 20b searches through the local feedback information table with the destination addresses as keywords and extracts feedback information of the respective channels corresponding to the destination addresses. Then, the MAC unit 20b determines transmission systems and transmission speeds based on the feedback information corresponding to the respective channels and outputs the determined transmission systems and transmission speeds to the transmission channel processing units 410 to 430 as transmission speed information.

The transmission channel processing units 410 to 430 select transmission systems and transmission speeds of the channels based on the respective pieces of transmission control information inputted from the MAC unit 20b. Then, based on the selected transmission systems and transmission speeds, the transmission channel processing units 410 to 430 apply the encoding processing and the modulation processing to the transmission frames inputted from the MAC unit 20 and the local feedback information inputted from the channel-information processing unit 30 to generate radio signals. Then, the transmission channel processing units 410 to 430 output the generated radio signals.

In this way, according to the fourth embodiment, the MAC unit 20b generates the local feedback information table in which the local channel reception information for the respective channels and the extracted feedback information are associated with the transmission source addresses and inserts the local feedback information into appropriate places in the transmission frames. Thus, it is possible to notify other radio communication apparatus of the local feedback information without having means for inserting the local feedback information anew and to reduce decline in efficiency of the radio communication apparatus.

In addition, since it is possible to notify local feedback information with a structure closed in a MAC layer and determine transmission systems and transmission speeds, it is possible to apply the radio communication apparatus to a system in a different physical layer that uses plural channels.

Moreover, since it is possible to perform processing with the processing closed in a MAC layer, for example, in the case of a system returning response frames in response to transmission frames, it is possible to insert local feedback information into part of the response frames, reduce radio bands in which the local feedback information is notified to other radio communication apparatus, and realize an increase in a radio capacity. The local feedback information is notified to the other radio communication apparatus in shortest time, which makes it possible to perform high-speed feedback processing even when a fluctuation state in a transmission channel is intense and deterioration of radio signals in the respective channels is severe.

Note that the transmission frames into which the local feedback information is inserted may be all transmission frames of the respective channels, or channels on which the local feedback information is transmitted may be determined based on the respective pieces of local channel reception information.

Figure 6:
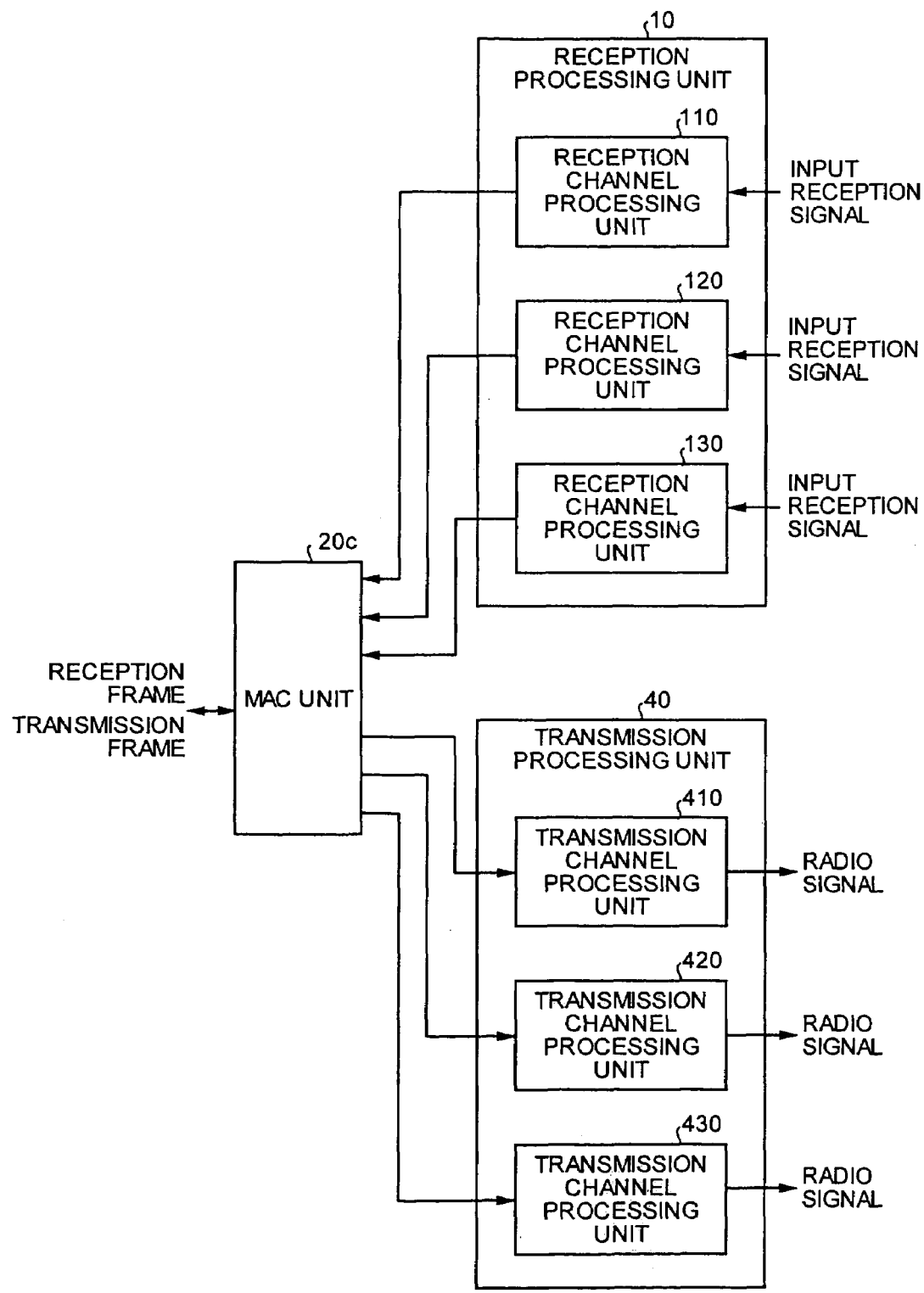
FIG. 6 is a block diagram of a structure of transmission and reception functions of a radio communication apparatus according to a fifth embodiment of the present invention.
Figure 7:
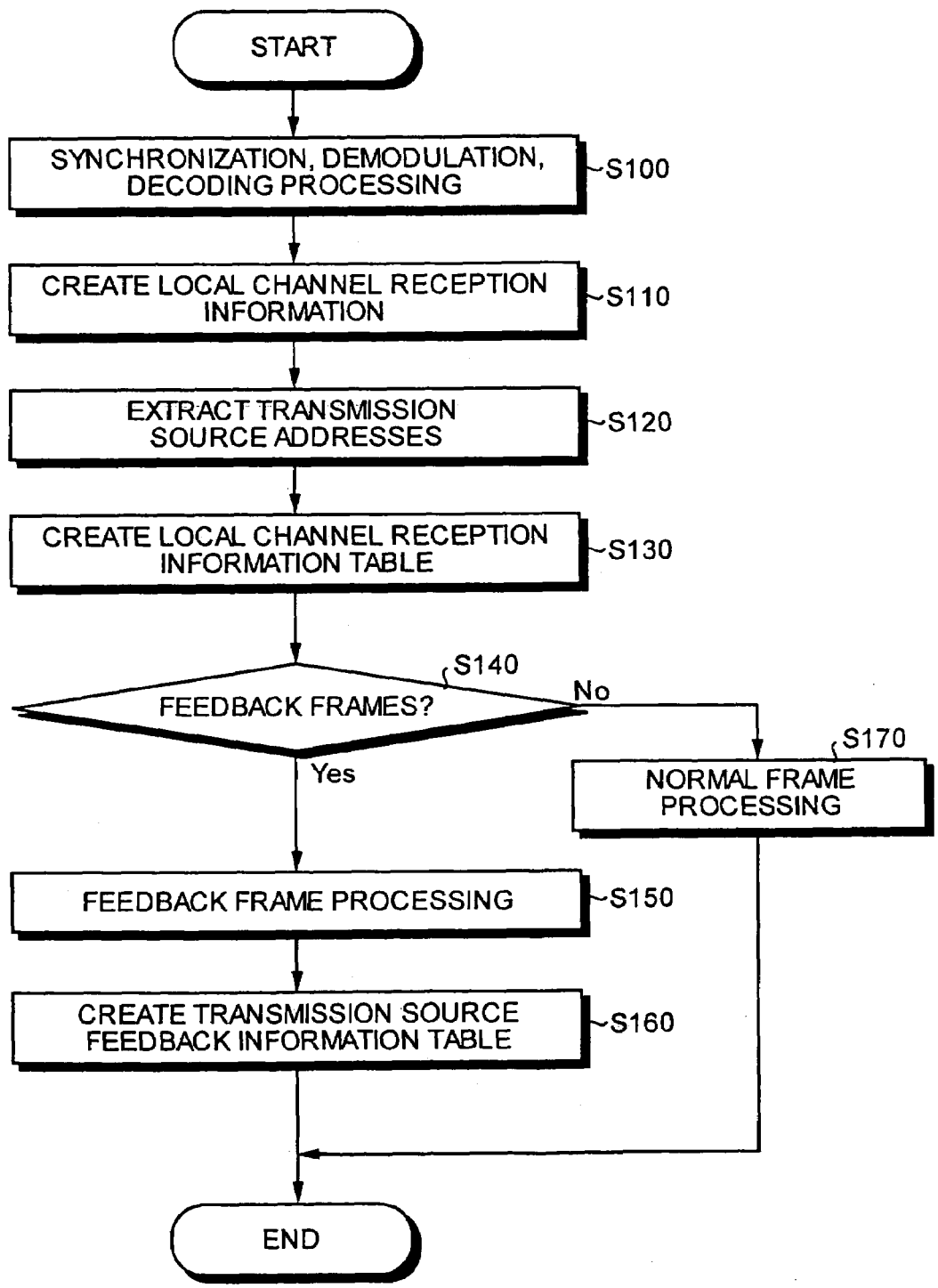
FIG. 7 is a flowchart for explaining a reception operation of the radio communication apparatus according to the fifth embodiment.
Figure 8:
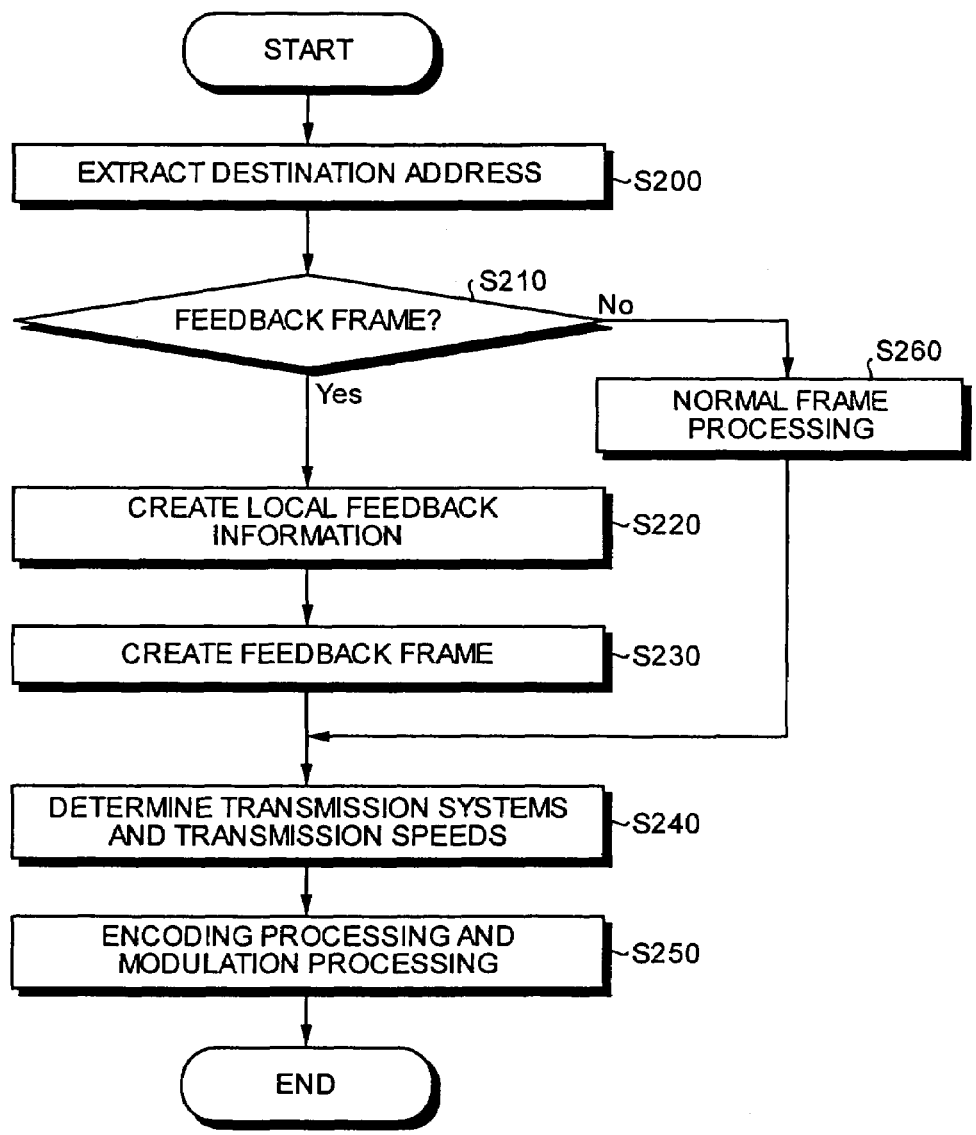
FIG. 8 is a flowchart for explaining a transmission operation of the radio communication apparatus according to the fifth embodiment.

A fifth embodiment of the present invention will be explained using FIGS. 6 to 8. FIG. 6 is a block diagram of a structure of transmission and reception functions of the radio communication apparatus 1 according to the fifth embodiment. The radio communication apparatus 1 according to the fifth embodiment includes a MAC unit 20c instead of the MAC unit 20b of the radio communication apparatus 1 according to the fourth embodiment shown in FIG. 5.

At the time of reception, the MAC unit 20c extracts transmission source addresses from decoded signals inputted from the reception channel processing units 110 to 130, respectively, and creates a local feedback information table in which the extracted transmission source addresses and local channel reception information notified from the reception channel processing units 110 to 130 are associated with each other. In addition, when the respective decoded signals are feedback frames for notifying other radio communication apparatus of local feedback information, the MAC unit 20c extracts transmission source addresses in the feedback frames and creates a transmission source feedback information table in which transmission feedback information for the respective channels in the feedback frames and the extracted transmission source addresses are associated with each other. When the decoded signals are normal frames, the MAC unit 20c applies the processing such as the protocol conversion and the frame conversion to the decoded signals, generates reception frames, and outputs the reception frames to an upper layer.

At the time of transmission, when transmission frames are feedback frames, the MAC unit 20c generates local feedback information based on a local channel reception information table and inserts the generated local feedback information into the feedback frames. The MAC unit 20c determines transmission systems and transmission speeds of the respective channels based on the transmission source feedback information table.

Next, operations of the radio communication apparatus 1 according to the fifth embodiment of the present invention will be explained with reference to flowcharts in FIGS. 7 and 8. First, a reception operation will be explained with reference to the flowchart in FIG. 7. The reception channel processing units 110 to 130 receive input information of channels corresponding to the reception channel processing units 110 and 130, respectively, and apply the synchronization processing, the demodulation processing, and the decoding processing to the input information to generate decoded signals. At the same time, the reception channel processing units 110 and 130 measure reception levels of input reception signals of the respective channels and generate local channel reception information based on the measured respective reception levels and reception channel processing internal information (steps S100 and S110). The reception channel processing units 110 to 130 output the respective decoded signals and the local channel reception information to the MAC unit 20c.

The MAC unit 20c extracts transmission source addresses from the decoded signals inputted from the reception channel processing units 110 to 130, respectively (step S120). Then, the MAC unit 20c creates a local feedback information table in which the extracted transmission source addresses and the respective pieces local channel reception information notified from the reception channel processing units 110 to 130 are associated with each other (step S130).

The MAC unit 20c judges whether the respective decoded signals are feedback frames for notifying other radio communication apparatus of local feedback information (step S140). When the respective decoded signals are feedback frames, the MAC unit 20c performs predetermined feedback frame processing such as extraction of transmission source feedback information from the decoded signals (step S150). Then, the MAC unit 20c creates a transmission source feedback information table in which the extracted transmission source feedback information and transmission source addresses extracted from the decoded signals are associated with each other (step S160).

When the respective decoded signals are normal frames, the MAC unit 20c performs normal frame processing of applying the processing such as the protocol conversion and the frame conversion to the respective decoded signals, generating reception frames, and outputting the reception frames to the upper layer (step S170).

Next, a transmission processing will be explained with reference to the flowchart in FIG. 8. The MAC unit 20c extracts a destination address from a transmission frame inputted from the upper layer (step S200). Then, the MAC unit 20c judges whether the transmission frame is a feedback frame (step S210). When the transmission frame is a feedback frame, the MAC unit 20c searches through the local feedback information table with the extracted destination address as a keyword and extracts local channel reception information of the respective channels. Then, the MAC unit 20c generates local feedback information from the extracted local channel reception information of the respective channels (step S220). Then, the MAC unit 20c inserts the generated local feedback information into the feedback frame to generate a feedback frame (step S230).

The MAC unit 20c searches through the transmission source feedback information table with the extracted destination address as a keyword and extracts transmission source feedback information of the respective channels corresponding to the destination address. Then, the MAC unit 20c determines transmission systems and transmission speeds based on the feedback information corresponding to the respective channels and outputs the determined transmission systems and transmission speeds to the transmission channel processing units 410 to 430 as transmission speed information (step S240).

The transmission channel processing units 310 to 430 select transmission systems and transmission speeds of the channels based on respective pieces of transmission control information inputted from the MAC unit 20c. Then, the transmission channel processing units 310 to 340 apply the encoding processing and the modulation processing to the transmission frames inputted from the MAC unit 20c based on the selected transmission systems and transmission speeds to generate radio signals. Then, the transmission channel processing units 310 to 340 output the generated radio signals (step S250).

When the transmission frames are normal frames, the MAC unit 20c performs normal frame processing of applying the processing such as the protocol conversion and the frame conversion to the transmission frames and generating transmission frames of the respective channels (step S260). In addition, the MAC unit 20c searches through the transmission source feedback information table with the extracted destination address as a keyword and extracts transmission source feedback information of the respective channels corresponding to the destination address. Then, the MAC unit 20c determines transmission systems and transmission speeds based on feedback information corresponding to the respective channels and outputs the determined transmission systems and transmission speeds to the transmission channel processing units 410 to 430 as transmission speed information (step S240).

The transmission channel processing units 410 to 430 select transmission systems and transmission speeds of the channels based on the respective pieces of transmission control information inputted from the MAC unit 20c. Then, based on the selected transmission systems and transmission speeds, the transmission channel processing units 410 to 430 apply the encoding processing and the modulation processing to the transmission frames inputted from the MAC unit 20c to generate radio signals. Then, the transmission channel processing units 410 to 430 output the generated radio signals (step S250).

In this way, according to the fifth embodiment, since a dedicated frame for transmitting local feedback information is provided, it is possible to notify other radio communication apparatus of feedback information of respective channels without requiring a change with respect to an existing system and with simplified control and processing. It is possible to select transmission systems and transmission speeds suitable for the respective channels.

Note that, when the dedicated frame for transmitting local feedback information is transmitted periodically, it is necessary to transmit the dedicated frame at a short period with respect to fluctuation in a transmission channel. Therefore, throughput declines. In addition, when the local feedback information cannot be transmitted, reliability of the local feedback information may decline to cause a communication error. In such a case, it is sufficient that the reception channel processing units 110 to 130 detect fluctuation in the transmission channel, and the MAC unit 20c judges the fluctuation in the transmission channel to determine a transmission interval of the dedicated frame for transmitting the local feedback information.

Figure 9:
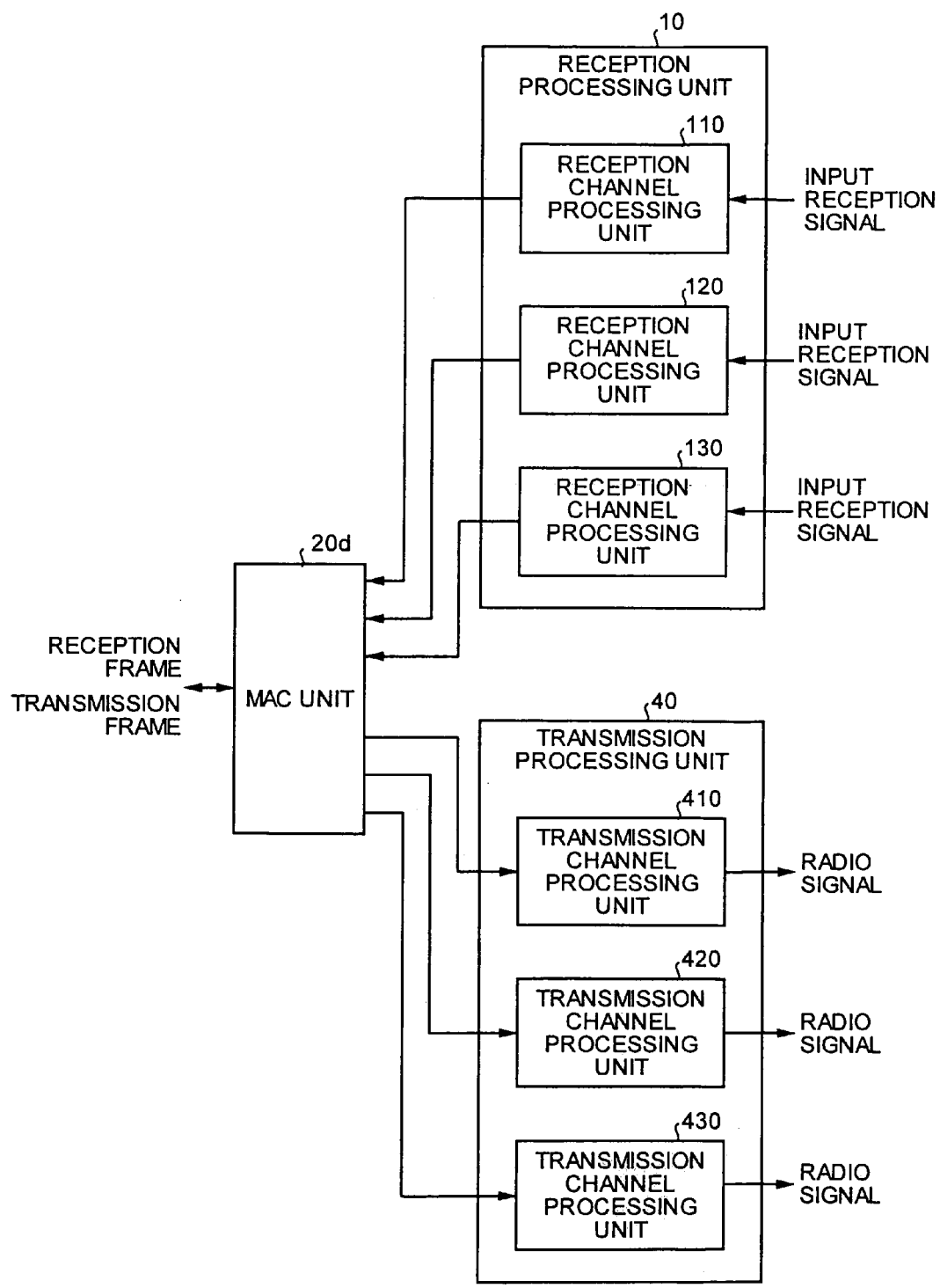
FIG. 9 is a block diagram of a structure of transmission and reception functions of a radio communication apparatus according to a sixth embodiment of the present invention.

A sixth embodiment of the present invention will be explained using FIGS. 9 and 10. FIG. 9 is a block diagram of a structure of transmission and reception functions of a radio communication apparatus according to the sixth embodiment. The radio communication apparatus 1 according to the sixth embodiment includes a MAC unit 20d instead of the MAC unit 20c according to the fifth embodiment shown in FIG. 6. Components having the same functions as those according to the fifth embodiment will be denoted by the identical reference numerals, and a redundant explanation will be omitted.

At the time of a reception operation, the MAC unit 20d has a function of also registering a creation time of day in creating a local feedback information table and a transmission source feedback information table in addition to the same function as at the time of the reception operation of the MAC unit 20c of the fifth embodiment.

At the time of a transmission operation, the MAC unit 20d applies the processing such as the protocol conversion and the frame conversion to a transmission frame inputted from an upper layer to generate transmission frames of respective channels. In that case, the MAC unit 20d inserts local feedback information into the respective transmission frames based on the local feedback information table and, at the same time, determines transmission systems and transmission speeds of the respective channels.

Operations of the radio communication apparatus 1 according to the sixth embodiment of the present invention will be explained with reference to a flowchart in FIG. 10. First, a reception operation will be explained. The reception channel processing units 110 to 130 receive input information of channels corresponding to the reception channel processing units 110 to 130, respectively, and apply the synchronization processing, the demodulation processing, and the decoding processing to the input information to generate decoded signals. At the same time, the reception channel processing units 110 to 130 measure reception levels of input reception signals of the respective channels, and generate local channel reception information based on the measured respective reception levels and reception channel processing internal information. The reception channel processing units 110 to 130 output the respective decoded signals and the local channel reception information to the MAC unit 20d.

The MAC unit 20d extracts transmission source addresses from the decoded signals inputted from the reception channel processing units 110 to 130, respectively. Then, the reception channel processing units 110 to 130 create a local feedback information table in which the extracted transmission source addresses, the respective pieces of local channel reception information notified from the reception channel processing units 110 to 130, and present times of day are associated to one another.

The MAC unit 20d judges whether feedback information is included in the respective decoded signals and, when feedback information is included in the respective decoded signals, extracts the feedback information in the decoded signals. The MAC unit 20d creates a transmission source feedback information table in which the transmission source feedback information extracted from the decoded signals, the extracted transmission source addresses, and present times of day are associated to one another.

The MAC unit 20d applies the processing such as the protocol conversion and the frame conversion to the respective decoded signals, generates reception frames, and outputs the reception frames to an upper layer.

Next, a transmission operation will be explained with reference to the flowchart in FIG. 10. The MAC unit 20d extracts a destination address from a transmission frame inputted from the upper layer (step S300).

The MAC unit 20d searches through the local feedback information table with the extracted destination address as a keyword and extracts local channel reception information of the respective channels and creation times of day of the local channel reception information (step S310). The MAC unit 20d calculates a difference between the extracted creation times of day and the present time of day. Then, the MAC unit 20d judges whether a calculation result is within a reference value decided in advance (step S320). When the calculation result is within the reference value decided in advance, the MAC unit 20d inserts the local feedback information into predetermined places of the transmission frames from the extracted local channel reception information of the respective channels (step S330). When the calculation result exceeds the reference value decided in advance, the MAC unit 20d judges that the local cannel reception information of the respective channels is different from present states of the respective channels because time has passed since the local channel reception information was created and does not insert the feedback information in the transmission frames. The MAC unit 20d applies the processing such as the protocol conversion and the frame conversion to the transmission frames to generate transmission frames of the respective channels. Then, the MAC unit 20d outputs the generated respective transmission frames to the transmission channel processing units 410 to 430.

The MAC unit 20d searches through the transmission source feedback information table with the extracted destination address as a keyword and extracts transmission source feedback information of the respective channels and creation times of day of the transmission source feedback information (step S340). The MAC unit 20d calculates a difference between the extracted creation times of day and the present time of day. Then, the MAC unit 20d judges whether a calculation result is within a reference value decided in advance (step S350). When the calculation result is within the reference value decided in advance, the MAC unit 20d determines transmission systems and transmission speeds of the respective channels based on the extracted transmission source feedback information (step S360). When the calculation result exceeds the reference value decided in advance, the MAC unit 20d judges that the local channel reception information of the respective channels is different from present states of the respective channels because time has passed since the local channel reception information was created and determines to use transmission systems and transmission speeds decided in advance (step S370). The MAC unit 20d notifies the transmission channel processing units 410 to 430 of the determined transmission systems and transmission speeds.

The transmission channel processing units 410 to 430 select transmission systems and transmission speeds of the channels based on the respective pieces of transmission control information inputted from the MAC unit 20d. Then, based on the selected transmission systems and transmission speeds, the transmission channel processing units 410 to 430 apply the encoding processing and the modulation processing to the transmission frames inputted from the MAC unit 20d to generate radio signals. Then, the transmission channel processing units 410 to 430 output the generated radio signals (step S380).

In this way, according to the sixth embodiment, in creating a local cannel reception information table and a transmission source feedback information table, creation times of day of the tables are registered, and the creation times of day and a present time of day are compared to judge reliability concerning whether the local channel reception information and the transmission source feedback information are used. Thus, it is possible to use information suitable for temporal fluctuation in a state of a transmission channel and to reduce a wasteful communication fee.

Note that, according to the sixth embodiment, the case in which the local feedback information is inserted into transmission frames is explained as an example. However, it is needless to mention that it is possible to apply the case to the first to the fifth embodiments by creating a local feedback information table in which transmission adresses, respective pieces of local channel reception information, and present times of day are assosiciated to one another and a transmission source feedback information table in which transmission source feedback information, extracted transmission source addresses, and present times of day are associated to one another.

As explained above, in the radio communication apparatus according to the present invention, a reception processing unit generates local channel reception information based on reception states of input reception signals of respective channels, a channel-information processing unit generates local feedback information based on the local channel reception information generated by the reception processing unit, inserts the generated local feedback information into radio signals, and transmits the radio signals. Thus, it is possible to notify other radio communication apparatus of states of the respective channels, and the other radio communication apparatus can select transmission systems and transmission speeds suitable for the states of the respective channels.

INDUSTRIAL APPLICABILITY

As described above, the radio communication apparatus according to the present invention is useful for a communication system that performs mutual communication using plural channels simultaneously and, in particular, suitable for a communication system in which a communication state is likely to change due to obstacles, weather conditions, and the like.

The invention claimed is:

1. A radio communication apparatus that is applied to a radio communication system and communicates with other radio communication apparatus in the radio communication system using one available channel or a plurality of channels, the radio communication apparatus comprising:

a reception processing unit that, when input reception signals of the channels of the radio communication system is received, measures reception states of input reception signals of each of the channels, generates local channel reception information of each of the channels based on a result of the measurement, and applies a reception processing to the input reception signals to generate decoded signals;

a media-access-control unit that, when data is transmitted using two or more channels, generates transmission frames for each of the channels using transmission data;

a transmission processing unit that generates radio signals including each of the transmission frames; and a channel-information processing unit that generates local feedback information based on the local channel reception information, and inserts the local feedback information generated into one of the radio signals or a plurality of the radio signals, wherein the radio communication apparatus transmits the radio signals including the local feedback information.

2. The radio communication apparatus according to claim 1, wherein the channel-information processing unit generates the local feedback information based on the local channel reception information and resource information that is a processing load of the media-access-control unit.

3. The radio communication apparatus according to claim 1, further comprising a selector that, when the channel-information processing unit inserts the local feedback information, selects the radio signals into which the local feedback information is inserted, based on-the local channel reception information.

4. The radio communication apparatus according to claim 1, wherein the reception processing unit extracts, when transmission source feedback information is inserted in each of the input reception signals by the other radio communication apparatus, the transmission source feedback information, the media-access-control unit determines a transmission system and a transmission speed based on the transmission source feedback information extracted, and the transmission processing unit generates the radio signals based on the transmission system and the transmission speed determined.

5. The radio communication apparatus according to claim 1, wherein the reception processing unit extracts, when transmission source feedback information is inserted in each of the input reception signals by the other radio communication apparatus, the transmission source feedback information, the media-access-control unit extracts a transmission source address included in the decoded signals at a time of reception, and extracts a destination address of transmission data at a time of transmission, and the channel-information processing unit generates a local feedback table, in which the local channel reception information, the transmission source feedback information extracted, and the transmission source address extracted are stored corresponding to each other at the time of reception, searches through the local feedback table with the destination address as a keyword at the time of transmission to generate the local feedback information based on the local channel reception information corresponding to the transmission source address for which the transmission source address stored in the local feedback table and the destination address coincide with each other, and determines a transmission system and a transmission speed based on the transmission source feedback information corresponding to the transmission source address for which the transmission source address stored in the local feedback table and the destination address coincide with each other, and the transmission processing unit generates the radio signals based on the transmission system and the transmission speed determined.

6. A radio communication apparatus that is applied to a radio communication system and communicates with other radio communication apparatus in the radio communication system using one available channel or a plurality of channels, the radio communication apparatus comprising:
- a reception processing unit that, when input reception signals of the channels of the radio communication system is received, measures reception states of input reception signals of each of the channels, generates local channel reception information of each of the channels based on a result of the measurement, and applies a reception processing to the input reception signals to generate decoded signals;
- a media-access-control unit that, when data is transmitted using two or more channels, generates local feedback information based on the local channel reception information, further generates transmission frames for each of the channels using transmission data, and inserts the local feedback information generated into one of the transmission frames or a plurality of the transmission frames; and
- a transmission processing unit that generates radio signals including each of the transmission frames, and transmits the radio signals generated.

7. The radio communication apparatus according to claim 6, wherein the media-access-control unit generates the local feedback information based on the local channel reception information and resource information that is a processing load.

8. The radio communication apparatus according to claim 6, wherein
- the media-access-control unit extracts, when transmission source feedback information is inserted in the decoded signals by the other radio communication apparatus, the transmission source feedback information, and determines a transmission system and a transmission speed based on the transmission source feedback information extracted, and
- the transmission processing unit generates the radio signals based on the transmission system and the transmission speed determined.

9. The radio communication apparatus according to claim 6, wherein the media-access-control unit
- at a time of reception, extracts a transmission source address included in the decoded signals and generates a local channel reception information table in which the local channel reception information and the transmission source address extracted are stored corresponding to each other, and
- at a time of transmission, extracts, when data to be transmitted is a feedback frame for notifying local feedback information, a destination address in the feedback frame, searches through the local channel reception information table with the destination address as a keyword, generates the local feedback information based on local channel reception information corresponding to the transmission source address for which the transmission source address stored in the local channel reception information table and the destination address coincide with each other, and inserts the local feedback information generated into the feedback frame.

10. The radio communication apparatus according to claim 9, wherein the media-access-control unit
- when generating the local channel reception information table, stores a time when the of the local channel reception information table is generated,
- when information stored in the local channel information table is used, compares a present time the time when the of the local channel reception information table is generated,
- when a difference between the present time and the time when the of the local channel reception information table is generated is within a predetermined range, generates the local feedback information based on the local channel reception information of the local channel information table, and
- when the difference exceeds the predetermined range, does not generate the local feedback information.

11. The radio communication apparatus according to claim 6, wherein the media-access-control unit
- when the decoded signal is a feedback frame from the other radio communication apparatus, extracts a transmission source address included in the decoded signal, extracts transmission source feedback information included in the feedback frame, and generates a transmission source feedback information table in which the transmission source address and the transmission source feedback information are stored corresponding to each other, and
- at a time of transmission, extracts a destination address from data to be transmitted, searches through the transmission source feedback information table with the destination address extracted as a keyword, and determines a transmission system and a transmission speed based on the transmission source feedback information corresponding to the transmission source address for which the destination address and the transmission source address stored in the transmission source feedback information table coincide with each other.

12. The radio communication apparatus according to claim 11, wherein the media-access-control unit
- when generating the local channel reception information table, stores a time when the of the local channel reception information table is generated,
- when information stored in the local channel information table is used, compares a present time the time when the of the local channel reception information table is generated,
- when a difference between the present time and the time when the of the local channel reception information table is generated is within a predetermined range, determines a transmission system and a transmission speed based on the transmission source feedback information of the transmission source feedback information table, and
- when the difference exceeds the predetermined range, determines a transmission system and a transmission speed that are decided in advance.

13. A radio communication apparatus for communicating with another radio communication apparatus, comprising:
- a reception processing unit which receives an input reception signal from the other radio communication apparatus, wherein the input reception signal includes a transmission source feedback information that indicates a reception level of the other radio communication apparatus;
- a media-access-control unit which determines a transmission system and a transmission speed for a transmission frame based on the transmission source feedback information; and
- a transmission processing unit which generates a radio signal to be transmitted to the other communication apparatus by modulating the transmission frame based on the transmission system and the transmission speed.

14. The radio communication apparatus according to claim 13, further comprising a channel-information processing unit, wherein the reception processing unit generates a local channel reception information based on a measured reception level or a receive signal indication of the input recognition signal, the channel-information processing unit generates a local feedback information that indicates the reception level of the radio communication apparatus based on the local channel reception information, and the transmission processing unit generates the radio signal by modulating the local feedback information.

15. The radio communication apparatus according to claim 13, wherein the reception processing unit generates a local channel reception information based on a measured reception level or a receive signal indication of the input reception signal, the media-access-control unit generates a local feedback information that indicates the reception level of the radio communication apparatus based on the local channel reception information, and the transmission processing unit generates the radio signal by modulating the local feedback information.

16. The radio communication apparatus according to claim 4, wherein the transmission system is a modulation system.

17. The radio communication apparatus according to claim 8, wherein the transmission system is a modulation system.

18. The radio communication apparatus according to claim 13, wherein the transmission system is a modulation system.

19. The radio communication apparatus according to claim 1, wherein the radio communication apparatus utilizes a MIMO transmission system.

20. The radio communication apparatus according to claim 6, wherein the radio communication apparatus utilizes a MIMO transmission system.

21. The radio communication apparatus according to claim 13, wherein the radio communication apparatus utilizes a MIMO transmission system, the reception processing unit receives a plurality of input reception signals, and the transmission processing unit modulates a plurality of transmission frames.

* * * * *